United States Patent [19]
Harrison

[11] Patent Number: 6,067,982
[45] Date of Patent: May 30, 2000

[54] COLLECTION OF SOLAR RADIATION AND ITS CONVERSION INTO ELECTRICAL POWER

[76] Inventor: John Harrison, White House, Caldwell, Richmond, North Yorkshire, United Kingdom, GB DL11 7PU

[21] Appl. No.: 09/101,069
[22] PCT Filed: Dec. 24, 1996
[86] PCT No.: PCT/GB96/03224
  § 371 Date: Dec. 18, 1998
  § 102(e) Date: Dec. 18, 1998
[87] PCT Pub. No.: WO97/24563
  PCT Pub. Date: Jul. 10, 1997

[30] Foreign Application Priority Data

Dec. 29, 1995 [GB] United Kingdom .................. 9526696

[51] Int. Cl.[7] ........................................................ F24J 2/54
[52] U.S. Cl. .......................... 126/571; 126/570; 126/576; 126/600; 126/696
[58] Field of Search .................................. 126/570, 571, 126/576, 600, 605, 688, 690, 696

[56] References Cited

U.S. PATENT DOCUMENTS

| | | | |
|---|---|---|---|
| 4,266,530 | 5/1981 | Steadman | 126/688 |
| 4,354,484 | 10/1982 | Malone . | |
| 4,416,262 | 11/1983 | Neidermeyer . | |
| 4,432,342 | 2/1984 | Lucas et al. | 126/570 |
| 4,463,749 | 8/1984 | Sobczak . | |
| 4,700,690 | 10/1987 | Strickland . | |

FOREIGN PATENT DOCUMENTS

| | | | |
|---|---|---|---|
| 0041455A1 | 12/1981 | European Pat. Off. . | |
| 85846 | 8/1983 | European Pat. Off. | 126/600 |
| 2 535 033 | 4/1984 | France . | |
| 2738859 | 3/1979 | Germany | 126/690 |
| 56-102646 | 8/1981 | Japan | 126/571 |
| 671832 A5 | 9/1989 | Switzerland . | |
| WO 95/06846 | 3/1995 | WIPO . | |

OTHER PUBLICATIONS

Patent Abstracts of Japan, vol. 4, No. 167 (M–42), Nov., 19, 1980 & JP 55 116055 A (Mitsubishi Heavy Ind. Ltd.), Sep. 6, 1980, Abstract.

*Primary Examiner*—Ira S. Lazarus
*Assistant Examiner*—Sara Clarke
*Attorney, Agent, or Firm*—Townsend and Townsend and Crew LLP

[57] ABSTRACT

Apparatus and methods for collecting and concentrating solar radiation for the generation of electrical power, the apparatus comprising a rotatable reflector dish which is pivoted to one side so as to be positioned between a vertical position or lowered to a horizontal position. When horizontal, the dish is protected by a surrounding weather-shield for protection against high winds. The reflector dish is preferably parabolic and mounted so as to concentrate and reflect the solar radiation into a receiver.

16 Claims, 11 Drawing Sheets

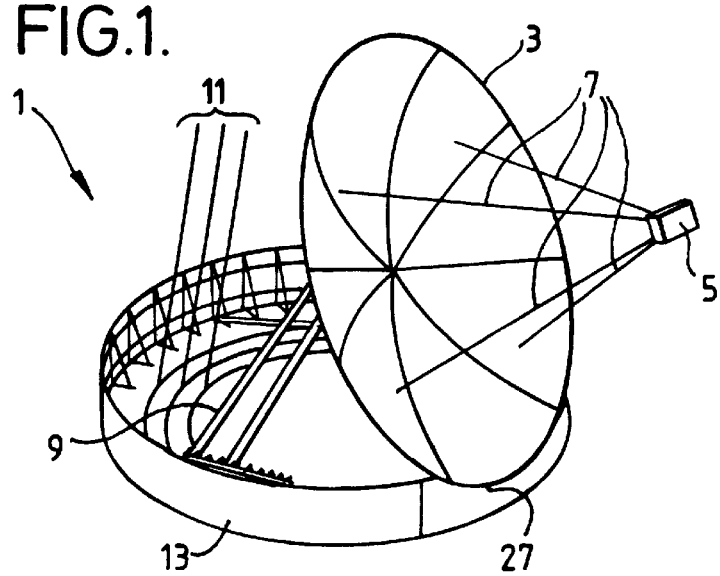
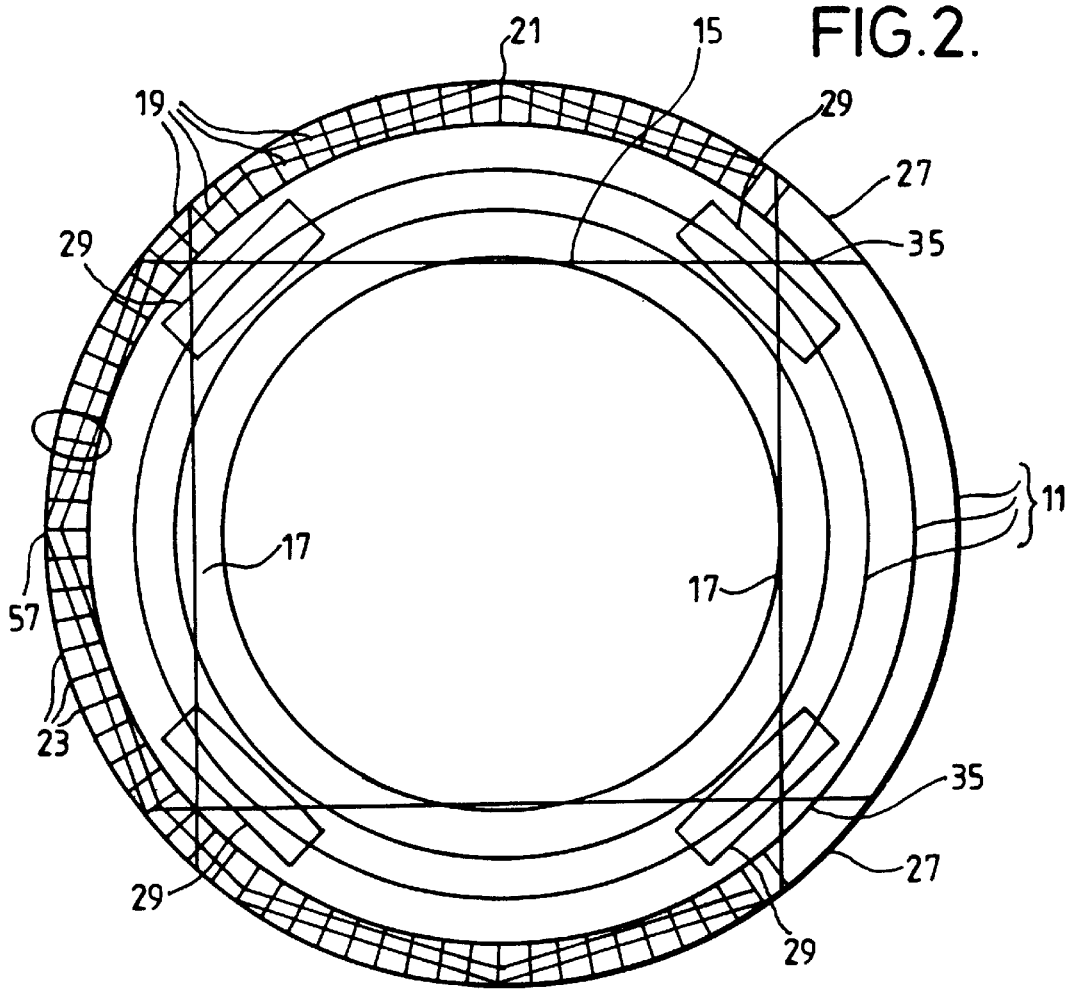

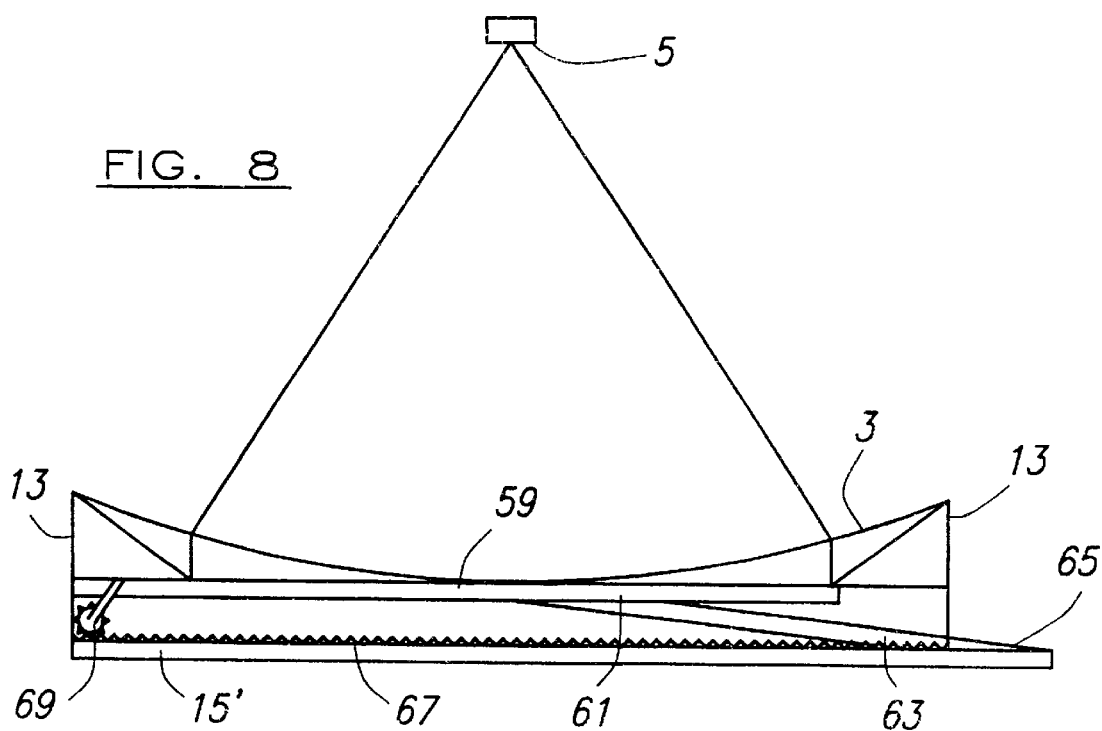
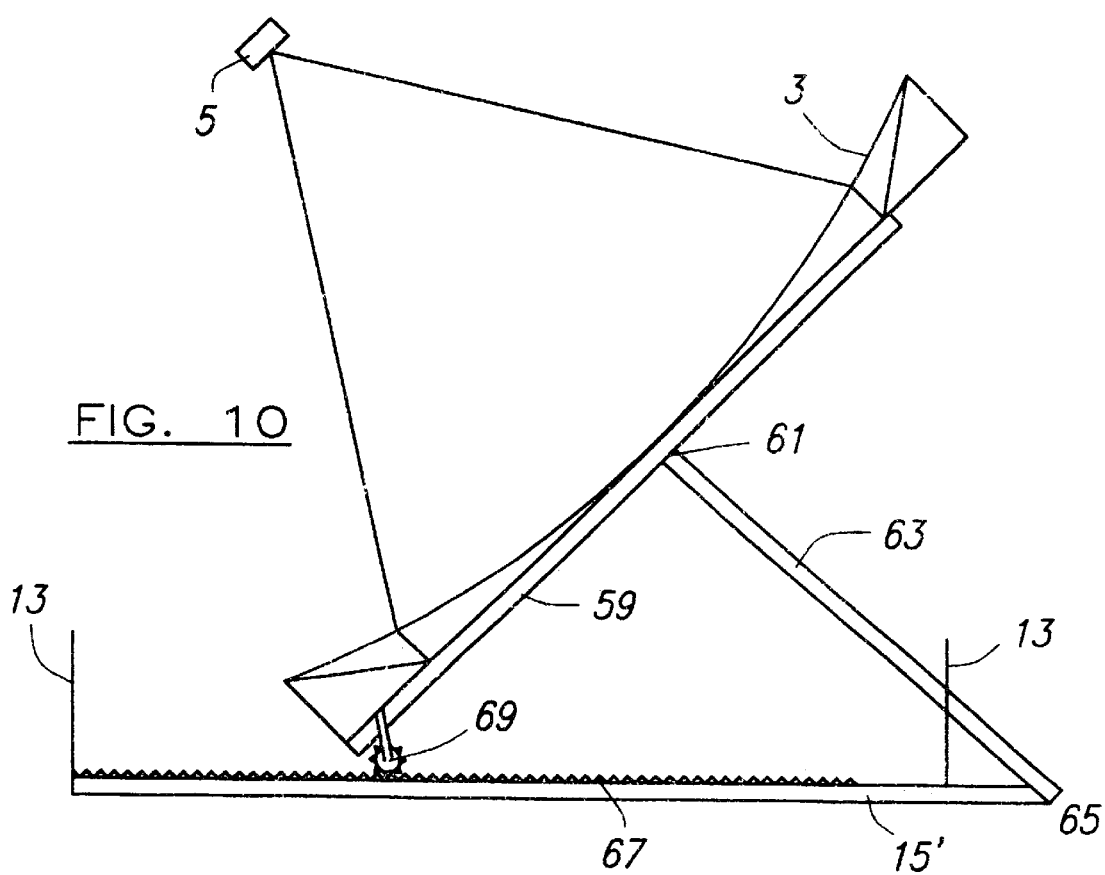

127a

129

131

127b 127b
129
133
115

COLLECTION OF SOLAR RADIATION AND ITS CONVERSION INTO ELECTRICAL POWER

BACKGROUND OF THE INVENTION

1. Field of the Invention

This invention relates to apparatus for collecting and concentrating solar radiation for the generation of electrical power. In particular, the invention particularly concerns the mounting of a solar reflector dish. In addition, features of the construction of a solar radiation receiver and of a parabolic reflector dish are also described.

2. Description of the Prior Art

Systems are known for the generation of electrical power through the conversion of thermal energy produced by the concentration of solar energy by a suitable reflector, such as parabolic trough systems, planar mirror array systems and parabolic reflector dish systems.

In a parabolic reflector dish system, one or more parabolic dishes, each having a reflective surface, are driven in azimuth and elevation so as to track the diurnal and seasonal movement of the sun in order to collect and concentrate solar radiation in or on a suitable receiver. At the receiver, the thermal energy produced by the concentration of solar radiation is usually conducted away from the receiver to a heat engine, generator or the like for the production of electrical power.

In order for a parabolic reflector dish system to be of greatest effect, the area of the parabolic reflector dishes must be as large as possible. This is achieved either by having a large number of small reflector dishes or by having one, or only a small number of, very large reflector dish.

In systems comprising many reflector dishes, the cost of providing an equivalent number of drive systems so that each dish accurately tracks the movement of the sun becomes prohibitively expensive. Accordingly, large parabolic reflector dishes are frequently employed.

Unfocussed solar radiation has a peak solar flux of 1000 $W/m^2$ at ground level. At a latitude of between 30° and 35°, the average power of unfocussed solar radiation during each day is approximately 700 $W/m^2$. At a typical system efficiency of about 30% therefore, in order to produce 1 Mw of electrical power, a parabolic reflector dish of about 4–5000 $m^2$, or of about 75 m diameter would be required.

In order to mount and to move such a dish so as to track the sun, a large dish support structure is required. However, a large dish presents a considerable cross-section to any wind, and so as to remain accurately aligned to the sun, the dish support structure must be made sufficiently strong to resist wind forces. In very high winds, both the dish and the support structure are liable to be damaged, thus both need to be strengthened to resist the effect of occasional high winds. Reinforcing the dish and the support structure increases the mass of the dish which leads to an increase in their cost and also in the costs of the systems which move the dish so as to track the sun.

It is also usual for parabolic dish reflectors to be gimbally mounted, i.e. so as to pivot about an axis lying in a plane at the center of the dish. Such a mounting enables the dish to be moved in both azimuth and elevation using simple drive means, and the mass of the dish can be counterbalanced. However, the gimbal mounting of a dish means that the dish must be supported so as to pivot about an axis which is at a height above the ground equal to the radius of the dish. In the event of high winds, such a dish cannot be moved out of the path of the wind, and therefore the dish support structure has to be reinforced adding to the mass and cost thereof.

Due to such factors, current parabolic solar radiation reflector dishes are limited in size to between 10 m and 15 m in diameter. Accordingly, several such dishes are required in order to produce a significant amount of power (25 dishes of 15 m diameter being required to produce the same power as a single 75 m diameter dish), which becomes prohibitively expensive, as explained above.

FR-A-2535033 discloses an orientable solar colelctor. In the survival position, the dish of the orientable solar collector is located at a horizontal level approximately equal to or lower than that occupied by its lowest part for any operating position. Means are provided at the place of implantation of the collector to protect the structure and the supporting device from the wind. The latter comprises elevating and orienting means connecting the structure to a baseplate and being actuated by at least one driving member in order to control the orientation of the surface at least in site and the elevation thereof relative to said horizontal level. Means are also provided to compare the measured speed of the wind with a predetermined maximum permissible speed which is variable according to the site, in order, if applicable, to impose on the structure an orientation according to a site which is greater than or equal to a minimum value compatible with the measured speed of the wind.

In order for apparatus as disclosed in FR-A-2 535 033 to avoid obstruction of radiation to a portion of the dish, means must be provided to lift the dish up so that it is clear from any shadow created by the excavated hole or bark of earth.

SUMMARY OF THE INVENTION

In accordance with the present invention, an apparatus for collecting and concentrating solar radiation comprises a reflector dish, means for rotating the dish about a first, substantially vertical axis, means for pivoting the dish about a second axis, the second axis lying in a plane parallel to but not coincident with the vertical axis, the pivoting means being effective to pivot the dish to a position between a first position in which the circumference of the dish lies in a substantially horizontal plane and a second position in which the circumference of the dish lies in a substantially vertical plane, and a weathershield extending around the vertical axis so as at least partially to surround the circumference of the dish in the first position, the height of the weathershield being such that the upper edge thereof is level with or extends above the circumferential edge of the dish in the first position, wherein the weathershield is rotatable and has a cut-away portion formed therein; the cut-away portion being orientable to prevent obstruction of solar radiation to the dish when the dish is between said first and second positions.

With such an arrangement, in which the second axis is preferably substantially horizontal, the reflector dish and the support structure therefore need only be strong enough to resist the effect of moderate winds, which keeps the cost of the apparatus, including that of the means for moving the dish so as to track the movement of the sun, to a minimum. In the event of high winds, the dish can be lowered to the first, horizontal position so that it is below the upper level of the weathershield, which protects the dish from, wind damage. The weathershield extends sufficiently downwardly to prevent winds from getting under the dish and the whole apparatus, when the dish is in the horizontal position, presents a low profile to wind from any direction, enabling dishes of large diameter to be used even in locations where high winds occur relatively frequently.

Those skilled in the art will appreciate that there are many possible kinds of dish support structures which can be employed to provide the "non-gimbal" dish mounting in accordance with the invention. For the mechanically least complex dish support structure however, the second axis is preferably fixed in relation to the first, vertical axis.

Suitably, the dish is mounted so as to pivot with respect to a cradle, which cradle is rotatable about the first, vertical axis. The weathershield may be mounted so as to rotate with the cradle. This is advantageous where the second axis lies within the circumference of the weathershield; it will be readily appreciated that in order for the weathershield not to shield or obstruct the lower part of the reflector dish when in the second, raised position, a part of the weathershield corresponding to that portion subtended by the second axis when the dish is in the second position may be cut away. Such an arrangement lessens the mass of the weathershield and, because it is mounted to rotate with the cradle, when the dish is lowered because of a high, wind the whole apparatus can be rotated so as to locate the cut away portion of the weathershield on the leeward side of the apparatus, to keep wind out from under the dish.

For the apparatus to present the lowest possible profile to a high wind, the lower edge of the weathershield is preferably close to the ground and the height of the second axis above the lower edge of the weathershield is preferably equal to or greater than the maximum horizontal distance between the second axis and the circumference of the dish when the dish is in the first horizontal position. This means that, in the second, vertical position the lowermost edge of the dish comes close to but does not impact the ground.

The apparatus is provided with means for rotating and pivoting the dish so as to track the sun's movement as is known in the art. In addition, means may be provided to sense the wind speed and direction and to lower the dish to the first position when the sensed wind speed exceeds a predetermined speed, i.e. a wind speed which might damage the dish. The means for rotating the dish would, as described above, be adapted to rotate the dish so that any cut away section of weathershield lay in the lee of the apparatus, with the second axis perpendicular to the sensed wind direction. It is well known that wind speeds may increase over a short period of time; consequently the means to lower the dish to the first position may be adapted to lower the dish quickly. The means to rotate the dish may also be adapted to turn the apparatus quickly so as to put the cut away portion of the weathershield to leeward. Alternatively, as the rotation of the dish so as to track the sun is relatively slow, requiring only a lower power rotational drive, a removable portion of weathershield may be provided, either to cover the cut away portion of weathershield or the arc that portion passes through, which may be less expensive than providing a high speed rotational drive.

A further problem with conventional apparatus is the efficient conversion of the solar radiation into electrical power. This problem is of particular significance where solar radition is collected over a large area and reflected onto and concentrated in a small area. The concentration of a large amount of solar energy in a small area produces a high concentration of thermal energy and there is a physical limit to the maximum solar power density which a receiver apparatus can tolerate without damage.

Preferably, the reflector dish is a point focus parabolic dish and a receiver is provided, located adjacent the focal point of the dish, for absorbing the solar radiation collected and concentrated thereon by the reflector dish and for generating electrical power.

Suitably, the receiver has an aperture through which the solar radiation passes into a cavity, which may be a so-called "black body absorber" and which extends behind the aperture. The cavity is defined by walls which are preferably formed of a material adapted to absorb a majority of the solar radiation incident thereon (and to reflect a minimum of the solar radiation) and to conduct heat to a working fluid contained in a pressure vessel surrounding the cavity walls, means being provided to circulate heated working fluid to a heat engine, or generator, for converting thermal energy carried by the hot working fluid into electrical power, the circulating means returning cooled working fluid back to the pressure vessel.

Preferably the interior of the cavity wall is shaped so as evenly to distribute thereover the density of solar power incident thereon resulting from the concentration of solar radiation thereon by the parabolic reflector dish.

The receiver may be mounted to one or more legs extending outwardly from the receiver dish outwith the reflected ray path, the circulation means extending between the receiver and the generator via one or more of the said leg(s).

Preferably, shield means are provided so as to protect the exterior of the receiver and each leg in the region adjacent the aperture from concentrated solar radiation incident thereon, to reduce the possibility of damage. The thermal energy contained in concentrated solar radiation can be so great as to melt most metals.

Suitably, the cavity walls are formed of molybdenum or of an alloy thereof. Such materials have excellent strength and thermal conductivity up to temperatures of 1100° C., and they are not highly reflective. Accordingly, the cavity walls can be relatively thin, which facilitates the conduction of thermal energy to the working fluid. The cavity walls are preferably coated with a high-temperature matt coating, to minimize reflections.

The working fluid may be water, or it may be sodium. Sodium is a preferred working fluid because it has a low vapor pressure (typically about 1.2 atmospheres at 900° C.), however, it solidifies at about 91° C. Accordingly, means are provided to heat and to liquefy sodium in the circulation means and in the generator to enable the working fluid to flow throughout the system when the dish is first aligned towards the sun. Sodium in the receiver is, of course, liquefied by the solar radiation incident on the receiver.

Suitably, the generator is a steam generator, of the type used in nuclear power reactors, in which thermal energy is transferred from the sodium working fluid to water, the resulting high pressure steam being used to drive a turbine to create electric power. A generator may be associated with a single reflector dish and its respective receiver or, as is known in the art, the heated working fluid from several dishes may be directed to a single large generator.

When molybdenum is exposed to air at high temperatures it has a tendency to oxidize. Accordingly, the cavity contains an inert gas or a vacuum. In order to achieve this, a window is provided over the aperture of the receiver. Such an arrangement also minimizes the loss of thermal energy out of the cavity by convection and conduction. The material of which the window is formed must be gas or air tight and must transmit radiation of wavelengths between 290 nm and 4000 nm. Glass, for example, is not a suitable material, because it is relatively opaque to infra red radiation, which is where a significant proportion of the energy in solar radiation lies. Sodium Chloride is a suitable window material, as is common in all infra red transmitters.

Alternatively, quartz may be used, although this is expensive and difficult to fabricate.

Preferably, the window is paraboloid in shape, so that the solar radiation concentrated thereon by the reflector dish impacts the window as near to the normal as possible. Such an arrangement minimizes the reflection of solar radiation away from the receiver by the window.

Preferably, the interior of the cavity is symmetrical about the axis of symmetry of the reflector dish and is shaped so as to distribute evenly thereover the density of solar radiation incident thereon. This may be achieved by shaping the cavity wall to take account of two factors, namely that increasing the angle of incidence of solar radiation on the cavity walls spreads that radiation over a larger area of cavity wall, thereby reducing the density, and increasing the internal radius of those parts of the cavity walls where the density of solar radiation is high will also reduce the density.

The cavity walls may therefore be configured such that, proceeding along the axis of symmetry of the reflector dish from the aperture to the distal end of the cavity, the cavity wall has at least the following shaped portions in the stated order: a first portion substantially parallel to the axis of symmetry; a second portion diverging from the axis of symmetry; a third portion surrounding the point of maximum internal radius of the cavity where the wall turns so as to converge on the axis of symmetry, and a fourth portion gradually converging to meet the axis of symmetry and so as gradually to increase the angle of incidence of solar radiation incident thereon to about 90°.

The first portion of the cavity wall compensates for any misalignment of the reflector dish, or portions thereof, causing the concentrated solar radiation to be reflected away from the receiver rather than accurately into the aperture. The second portion is effective to spread the incident solar radiation over a larger area by increasing the angle of incidence thereof. The internal radius of the receiver also increases in this portion, which also spreads the solar radiation over a larger area. The second portion is important, since the outer edges of the parabolic reflector dish receive the majority of the solar radiation incident on the dish and concentrate that radiation on the second portion of the cavity wall, and in order to be able to construct the cavity walls of homogeneous material and to avoid "hot spots" of concentrated energy in the cavity walls it is necessary to ensure that the energy density of the solar radiation is uniform by reducing the density in this portion.

In the third portion, the internal radius of the cavity walls is greatest. However, this portion receives the minority of the concentrated solar radiation from the annulus on the reflector dish about half way along its radius. This area of the reflector dish receives and concentrates less solar radiation than does the outermost portion of the dish. In order to provide uniform density of solar radiation along this portion of cavity wall, it is therefore necessary to increase the density, which is achieved by increasing the angle of incidence of the solar radiation incident thereon.

The majority of the solar radiation concentrated on the fourth portion of the cavity wall is provided by the innermost area of the reflector dish. This part of the dish collects and concentrates proportionally less solar radiation than the outer parts of the dish, and therefore, to account for this, the angle of incidence of the solar radiation on the fourth portion is increased, and the internal radius of the cavity reduced, so as to increase the density of incident solar radiation in order to render the density more uniform.

This shape of cavity not only evens out the solar radiation density over the cavity wall, but also cuts down on convection and black body radiation losses from the receiver. The internal cavity is so shaped as to retain any reflected solar radiation within the cavity rather than to reflect radiation out of the cavity through the window.

The reflector dish is preferably parabolic, the exact shape of the parabola being determined so as to represent a compromise between a shape which gives a large surface area, in order to collect and concentrate the maximum solar radiation for a given dish diameter, and a shape giving a dish of minimum "depth", or height when the dish is in the first, horizontal position, so that the apparatus presents the least surface area to a high wind when the dish is in the first position.

In order to provide a dish which is inexpensive, light yet sufficiently strong and easy to construct accurately, the dish preferably comprises a plurality of reflective planar segments, or sheets, mounted to and supported by a frame. The frame may comprise a plurality of support members extending radially inwardly from the outer circumferential edge of the dish toward the center thereof and having a planar segment supporting surface formed as a sector of a parabola or in a series of linear steps approximating thereto, adjacent support members being connected.

The maximum size of the planar segments is limited by the size of the receiver, by the accuracy with which each planar segment is aligned so as to reflect solar radiation incident thereon into the aperture and by the overall shape of the parabolic dish.

Suitably, each support member has a connecting member mounted thereto so that when the connecting members of adjacent support members are connected together to form the frame, the connecting members form a circle, or cylinder, centered on the center of the dish and with a radius of about ¾ the radius of the dish. Each planar segment may be mounted so as to span the radial distance between two support members, and adjacent support members may be connected in such a way as to subtend a substantially equal angle at the center of the dish.

So as to reduce the weight of the dish while maintaining its structural integrity, it is not necessary for all of the support members to extend the full distance from the outer circumferential edge of the dish to the center thereof. Instead, some of the support members may only extend to a point half way along a radius of the dish. This takes advantage of the fact that, as the radius of a circle increases, the circumference also increases, and vice versa. Accordingly, a planar segment of a size sufficient to span the distance between two adjacent support members at the outer circumference of the dish would span the distance between three adjacent support members at half the radius (and between four adjacent support members at one quarter the radius, and so on).

Each planar segment having, when mounted to the frame, an outer edge furthest from the center of the dish which is substantially perpendicular to a line extending from the center of the said outer edge to the center of the dish, the length of the outer edge of each planar segment is preferably equal to or less than a predetermined maximum length substantially equal to the distance between adjacent support members at the outer circumferential edge of the dish. The predetermined maximum length is, as stated above, dependent upon the size of the receiver.

Suitably, a first support member is interposed between a second support member which extends from the circumferential edge of the dish to the center thereof and a third support member, the first support member extending radially inwardly only to a point where the distance between the second and third support member is equal to the predetermined maximum length.

Such an arrangement not only reduces the overall number of planar segments, but reduces the lengths and hence the weights of at least some of the support members, without compromising the structural strength of the frame supporting the dish. Only some of the support members need extend the complete distance from the outer edge of the dish to the center thereof; the exact number of such support members is dependent upon factors such as the overall size of the dish and the maximum size of the receiver (which determines the maximum size of the planar segments), as are the sizes of those support members which are not as long as the radius of the dish.

Advantageously, the frame comprises a plurality of sets of support members, each set comprising a series of support members having lengths $l_1, l_2, l_3 \ldots l_x$, wherein x is an even number and wherein the length of each support member is defined by the equations $$l_1 = L \tag{1}$$

$$l_n = \frac{L}{2} \text{ where } n \text{ is even} \tag{2}$$

$$l_{(\frac{x}{2}+1)} = \frac{x-1}{x} \tag{3}$$

where $n$ is less than $\frac{x}{2}$ and not even, (4)

$l_n$ = 3/4 $L$ where $n + 1$ is exactly divisible by 4
  = 7/8 $L$ where $n + 3$ is exactly divisible by 8
  = 15/16 $L$ where $n + 7$ is exactly divisible by 16
  = 31/32 $L$ where $n + 15$ is exactly divisible by 32

$$l_n = l_{(x+2-n)} \text{ where } n > \frac{x+2}{2} \tag{5}$$

L being the distance from the circumferential edge of the dish to the center thereof.

It will be appreciated that the features of "non-gimbal" mounting of a reflector dish, of the construction of a solar radiation receiver and of the construction of a parabolic reflector dish as described above represent significant improvements over known apparatus for the conversion of solar radiation into electrical power. It will also be understood by those skilled in the art that each of these features is capable of being employed independently of the others.

BRIEF DESCRIPTION OF THE DRAWINGS

FIG. 1 is a perspective view of a parabolic reflector dish apparatus in accordance with the invention;

FIG. 2 is a plan view of one embodiment of part of the supporting frame for the apparatus of FIG. 1;

FIGS. 8, 9 and 10 are views of a second embodiment of a frame mechanism for supporting and moving the dish;

DETAILED DESCRIPTION OF THE PREFERRED EXEMPLARY EMBODIMENTS

Figure 3:
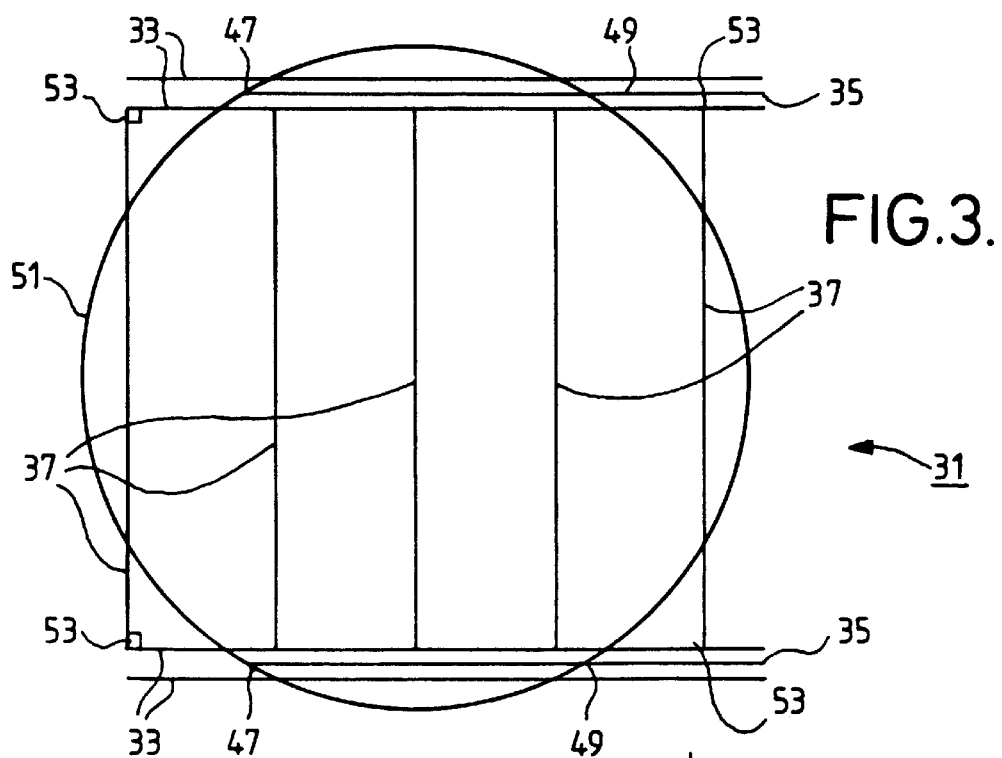
FIG. 3 is a plan view of another part of the supporting frame for the apparatus of FIG. 1.

FIG. 1 shows an embodiment of an apparatus 1 in accordance with the invention for collecting and concentrating solar radiation for the generation of electrical power. The apparatus comprises a parabolic dish 3 for reflecting solar radiation into a receiver 5 mounted in a position adjacent the focal point of the dish by a number of legs 7.

The dish is mounted to a cradle, or chassis, 9, which includes a mechanism for elevating the dish 3 and the receiver 5, and which is described further below. The cradle 9 is mounted so as to rotate around a number of tracks 11 and has mounted to it a weathershield 13 which substantially surrounds the dish 3 when it is lowered to a horizontal position.

The apparatus 1 works in the following manner. The cradle 9 is driven to rotate and elevate the dish 3 into a position facing the sun, whereupon solar radiation incident on the dish 3 is collected and reflected so as to concentrate the solar radiation on, or in, the receiver 5. The receiver 5 is adapted to absorb thermal energy which is then converted to electrical power. This is achieved by pumping a working fluid, such as water/steam, which is heated in the receiver 5, to a turbine or heat engine (not shown), where the thermal energy in the working fluid is used to drive an electrical generator. The cooled working fluid is then circulated back to the receiver 5. The circulation lines for the working fluid advantageously pass along, or within, one or more of the legs 7 and, via a flexible linkage (not shown) at the base of the apparatus 1, to and from the generator. Heated working fluid may circulate from more than one such apparatus 1 to a single generator.

The rotational and elevational drive means (not shown) are effective to move the dish in azimuth and elevation so as to catch the diurnal and seasonal movement of the sun, as is known. In the event of a high wind, sufficient to damage the dish 3 or to topple the apparatus, the dish 3 is lowered so that it is horizontal. The height of the weathershield 13 is such that, when the dish 3 is horizontal, the top edge of the weathershield 13 is level with, or preferably slightly above, the circumferential edge of the dish 3. This prevents the wind from getting under the dish 3, and possibly causing damage to it.

It can be seen from FIG. 1 that the weathershield 13 has a portion cut away. This portion corresponds to the lowermost portion of the dish 3, when in the raised position as shown, so that that portion of the dish is not in the shadow of the weathershield 13. This allows the dish 3 to be elevated by being pivoted about an axis which is as low as possible, which means that the apparatus 1 (with the dish 3 lowered) presents as low a profile as possible to a strong wind.

Referring to FIG. 2, the dish chassis 9 is supported by and rotates on five concentric circular tracks 11, similar to railway tracks. The chassis 9 comprises two parallel beams 15 which run on tracks 11. Between and perpendicular to beams 15 are two similar beams 17, which also run on tracks 11. In the same plane as and connecting the ends of one end of beams 15 and both ends of beams 15 and 17 around the circumference, are beams 19. On the long arcs between beams 15 and between beams 17 beams 19 go to a point directly above and run on the outermost of the tracks 11 at points 21.

Figure 5:
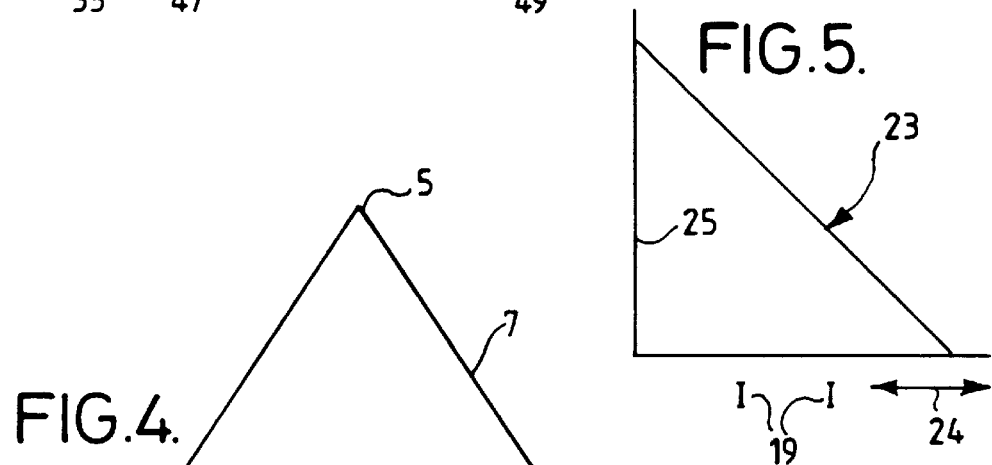
FIG. 5 is an enlarged view of the circled area of FIG. 2.

Mounted on and perpendicular to beams 19 are a plurality of triangular frames 23 (see FIG. 5). As shown by arrow 24, they are mounted at varying distances across beams 19, so that column 25 lies directly above the outermost track 11. Thus, columns 25 form a circle above that track. To the columns 25 cladding sheets are attached to form the weathershield 13. Frames 23 only extend to points 27 shown in FIG. 2. Ballast boxes 29 are mounted on beams 15 and 17 and are filled with earth or other suitable material to stabilize the chassis 9.

Figure 4:
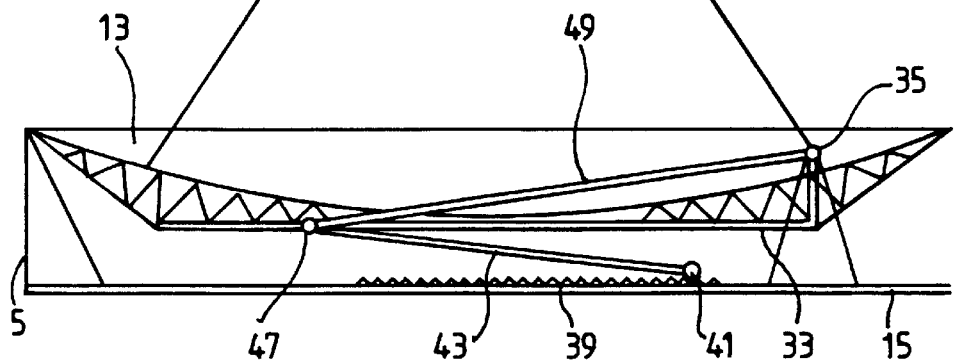
FIG. 4 is a schematic side view of the frame shown in FIGS. 2 and 3 with the dish in a first, horizontal position.

Mounted on the chassis 9 is a structure 31 (see FIG. 3) for supporting and elevating the dish 3. This structure 31 consists of two pairs of parallel beams 33. The gap between each pair of beams 33 is directly above beams 15. On the ends of and raised above beams 33 are pivots 35. These pivot with two pivots on beams 15 and lie directly above the outermost but one of the tracks 11. Beams 37 lie between and perpendicular to beams 33. Referring to FIG. 4, on beams 15 is a rack 39 served by a pinion 41. Pinion 41 is on the end of column 43 and lies directly above the central track 11. Column 43 is telescopically extendable to about 180% of its original length by a further rack and pinion system 45 (see FIG. 7). The other end of column 43 from pinion 41 is pivot 47 between beams 33. Beam 49 connects pivot 47 to pivot 35, and runs just below the dish 3 and through the dish support members (described later). Beam 49 serves to strengthen the dish support structure.

Figure 6:
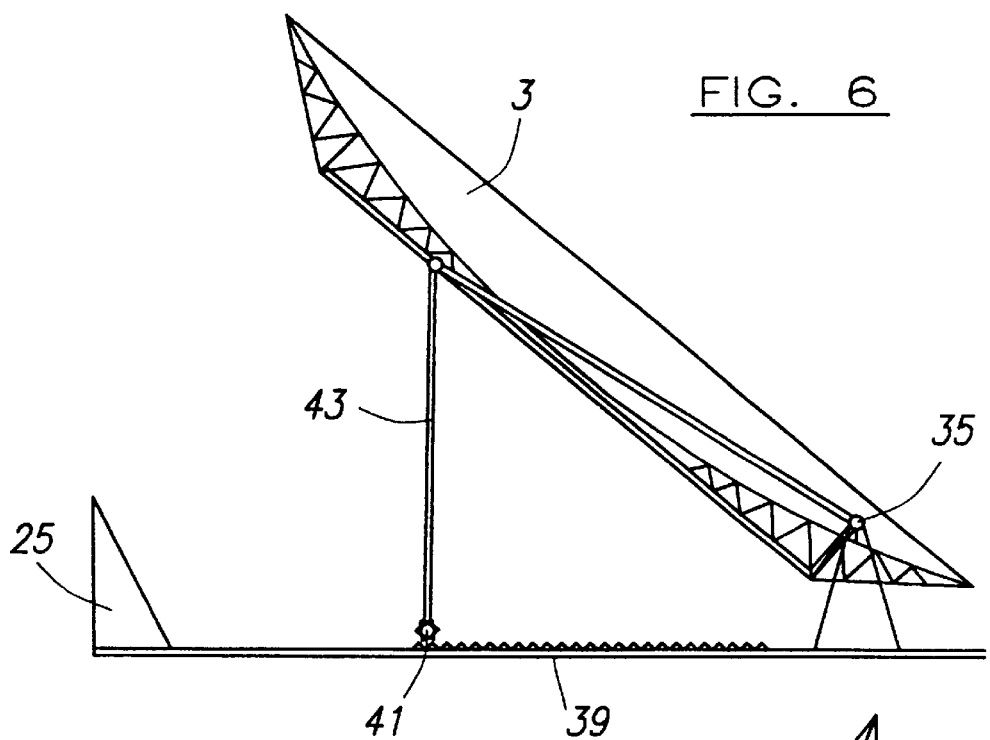
FIGS. 6 and 7 are side views similar to that of FIG. 4 but showing the dish in an intermediate and a second, vertical position, respectively.
Figure 7:
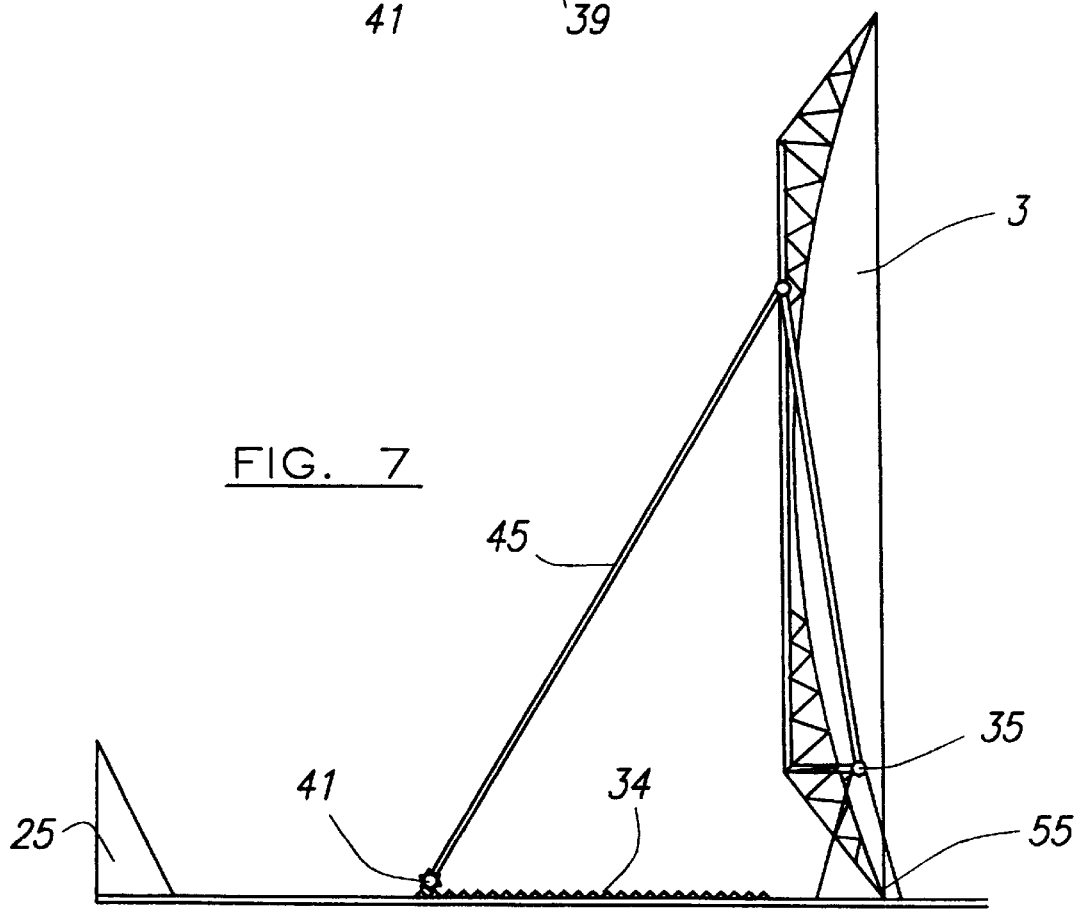
Figure 9:
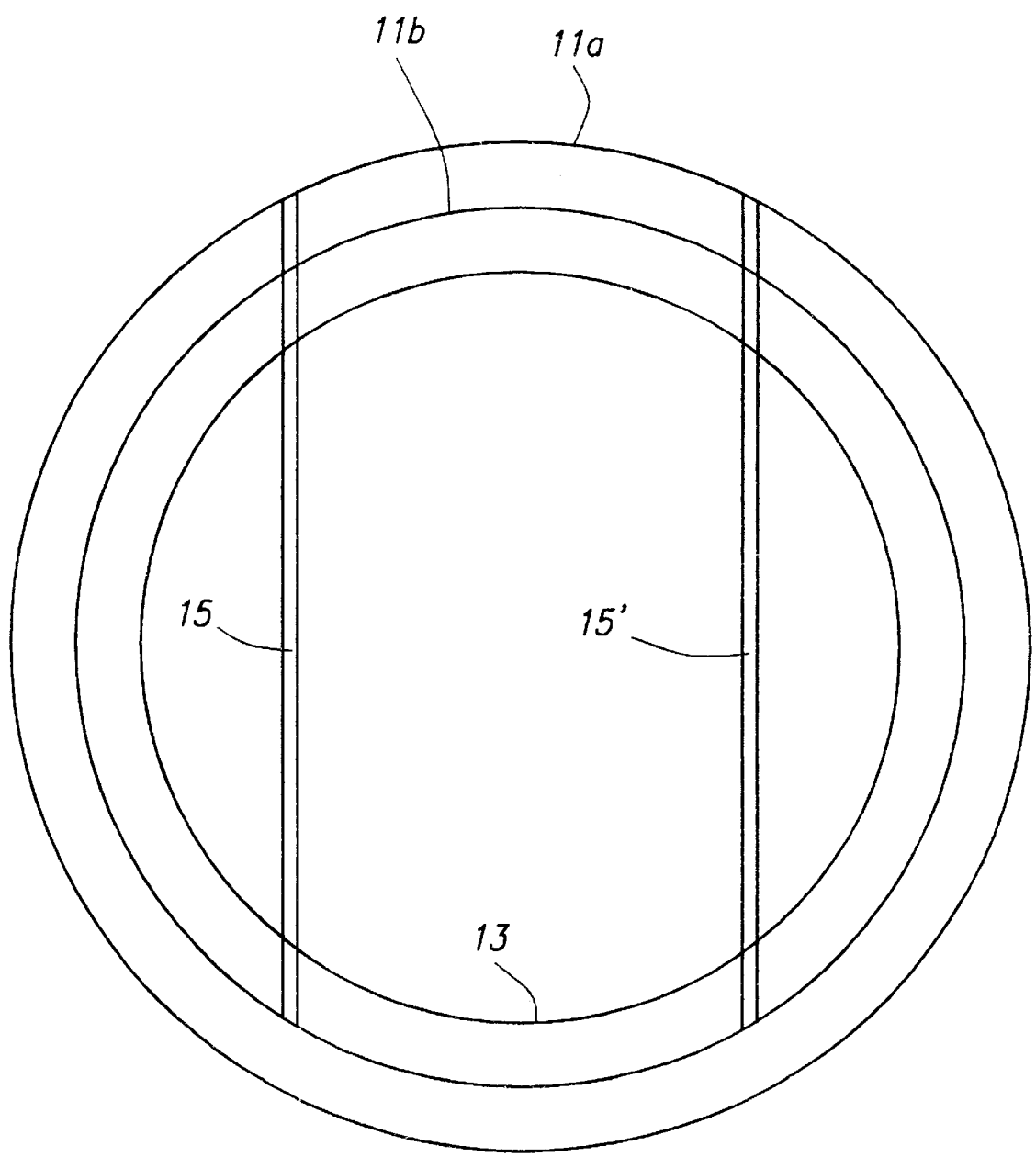
Figure 11:
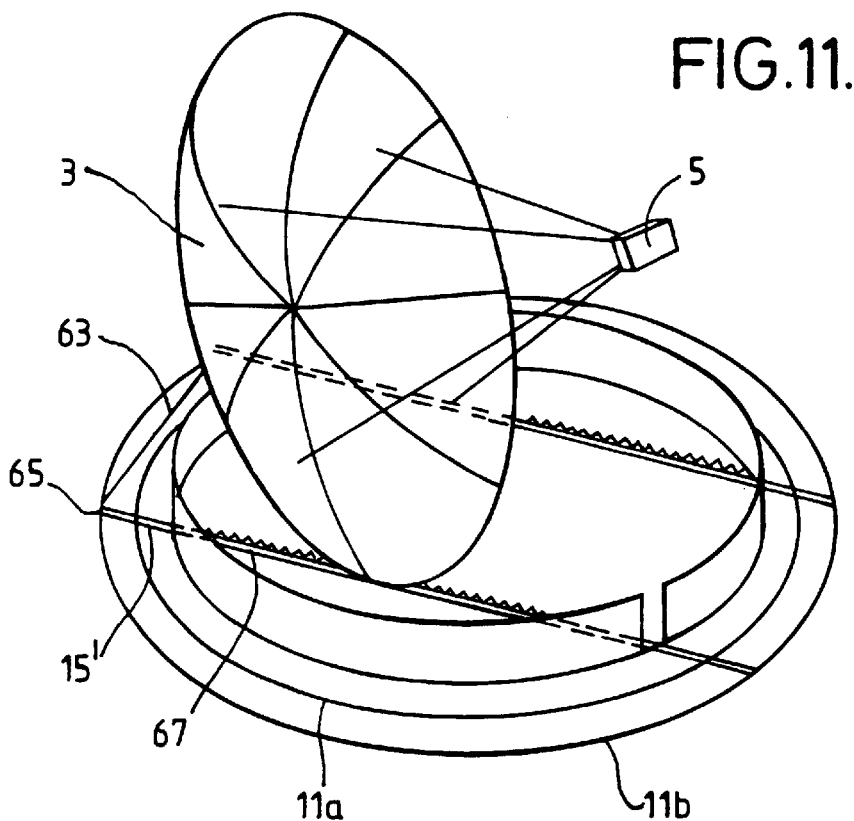
FIG. 11 is a perspective view of the apparatus incorporating the mechanism of FIGS. 8 to 10.

As pinion 41 moves along rack 39 it raises the dish support structure about pivots 35 until column 43 is vertical, as shown in FIG. 6. At this point the pinion lies directly above the innermost track 11, column 43 and the rack and pinion means 45 then extends telescopically, until the dish 3 is vertical as shown in FIG. 7.

The parabolic dish 3 comprises a reflective covering supported by a number of radially extending support members, to be described in more detail below. Adjacent support members are connected along a circle 51 shown in FIG. 3.

The circle 51 is centered on the square formed by a line at the midpoint between each pair of beams 33 and the two outermost beams of beams 37. Pivots 47 are directly below the point where circle 51 intersects the midpoint between each pair of beams 33.

At point 53 (FIG. 3), where beams 33 meet the two outermost beams 37, are mounted the ends of legs 7 which support the receiver.

The motors which rotate the dish chassis and drive the rack and pinion systems need not be very powerful because the movement needed to track the sun is only very slow. However, if high winds develop, the dish 3 must be lowered and rotated quickly. The lowering could be achieved by disengaging the motors and using a controlled braking system. A high speed drive system would have to be provided to rotate the dish 3 into the wind.

The above embodiment has been designed to be as low as possible when the dish 3 is in the lowered position, to keep the weathershield 13 low and in the slower winds near the ground. This is a trade-off between keeping pivots 35 below the dish 3, and as far under the dish 3 as possible to keep beams 33 short and to reduce the bending moment on them, and keeping the lowermost edge 55 of the dish (see FIG. 7) above tracks 11 when the dish 3 is in the duly raised position. Point 55 could be kept high by putting beams 15 and therefore each pair of beams 33 closer together, but this would lengthen beams 33 and also reduce the twisting resistance of the dish support structure. It may be more cost effective to raise beams 33 until their ends are at the same level as pivot 35. Beams 49 would then not be needed, but the dish 3 would be around twice as high in the lowered position, requiring the weathershield 13 to be twice as high. This alteration would have the advantage that the means used to raise the dish 3 need not be so compact in the lowered position, because there would be more room between beams 33 and 15. It could also be more cost effective to allow beam 49 or even pivot 35 to protrude through the dish 3 and lose only a small fraction of the total reflective area of the dish 3, and this alteration would make the dish 3 and weathershield 13 lower than that described above.

The curvature of the dish 3 is also a trade off. If the dish 3 is deep, the receiver 5 need not be as high, but deep dishes have several disadvantages. The area of the dish is greater for the area of sunlight it intercepts, and this requires more reflective material and is more expensive to manufacture. Deep dishes are also higher in the lowered position so higher weathershields are required. Perhaps most importantly, the angle at which the reflected rays of solar radiation strike the receiver 5 from the outer edges of the dish (which is where the majority of the solar radiation is reflected from) is shallower. This means that rays reflected from the outer edge of the dish 3 strike the receiver 5 where they may only be reflected twice in the receiver 5 before leaving it. After only two reflections, the ray will still carry a significant amount of energy, which will be lost.

Thus, the dish 3 is preferably kept shallow and one with a radius equivalent to x=0.2 given a height of y=0.04 is chosen (the dish surface being defined by the equation $y=x^2$). The gradient at the outer edge of the dish 3 is then 0.4 which is about 22°, thus light rays strike the receiver 5 at about 45°. This places the receiver 5 about 1.25 dish radii above the bottom center of the dish 3.

The apparatus described above would be suitable for operation in wind speeds up to approximately 15 m/s. For a dish of 75 m diameter, such a wind would produce a force of about 65–85 tonnes, when the dish 3 is fully raised and square on to the wind. Accordingly, the dish 3, receiver 5 and support structure 31 are preferably designed to weigh a similar amount. The ballast boxes 29 help prevent the structure from falling over in high winds.

In the event of high winds, the dish 3 is lowered to the horizontal position so as to be protected from the wind by the weathershield 13. The apparatus 1 is also rotated so that point 57 (see FIG. 2) faces the wind, putting the open arc (between points 27 in FIG. 2) of the weathershield 13 to leeward.

Alternative means of raising the dish may be provided, such as multiple stage hydraulic rams or single stage rams in combination with rack and pinion systems. A removable weathershield (not shown) could be placed around the arc where the weathershield 13 is not present. This may be more cost effective than providing a high speed rotating drive to rotate point 57 into the wind, should high winds be likely to develop without warning.

FIGS. 8 to 11 illustrate an alternative mechanism for supporting and elevating the dish 3. Beams 15', similar to beams 15 in FIG. 2, extend through the weathershield 13 which extends as a substantially complete circle, broken only above beams 15'. Members 59 are mounted to the base of the dish 3 and are pivotally mounted, at point 61, to the end of other members 63. The other ends of members 63 are pivotally mounted, at point 65, to the ends of beam 15'. A rack 67 is fixed to the top of each of beams 15' and pinions 69 fixed to the ends of members 59. Rotation of the pinions 69 is effective to raise the dish 3 from the lowered position shown in FIG. 8 towards the vertical (FIGS. 10 and 11), Further tracks 11a, 11b are provided, outside the circumference of the weathershield 13, for the ends of beams 15' to run on.

Figure 12:
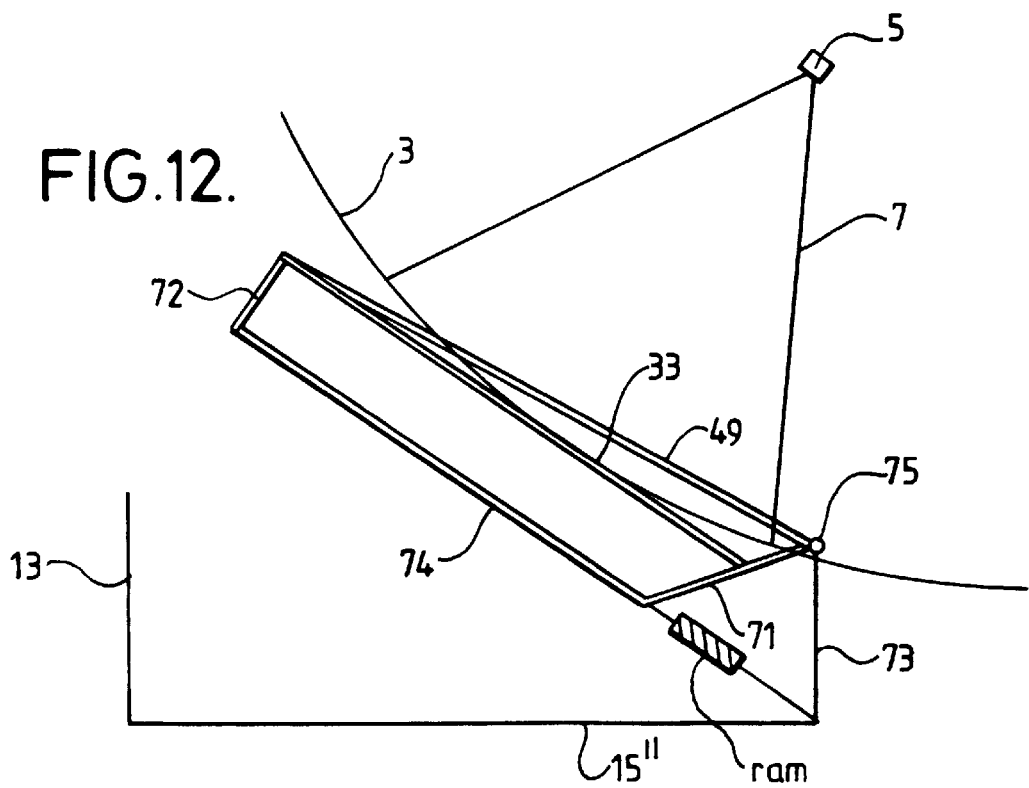
FIG. 12 is a side view of another embodiment of a frame mechanism for elevating the dish.

FIG. 12 illustrates another mechanism for supporting and elevating the dish 3. As in FIG. 2, beams 15" extend only within the circumference of the weathershield 13. At one end of the beams 15" is fixed a post with a pivot 75. Beams 49 and 71 extend from this pivot and the dish skeleton sits on beam 33 which interconnects beams 49 and 71. Additional beams 72 and 74 are added between beams 71 and 33 for strength. A ram is connected between beams 71 and post 73 to elevate the dish 3 to the required position. The post 73 is preferably sufficiently high to prevent the lowermost edge 55 of the dish 3 from touching the ground.

Figure 13:
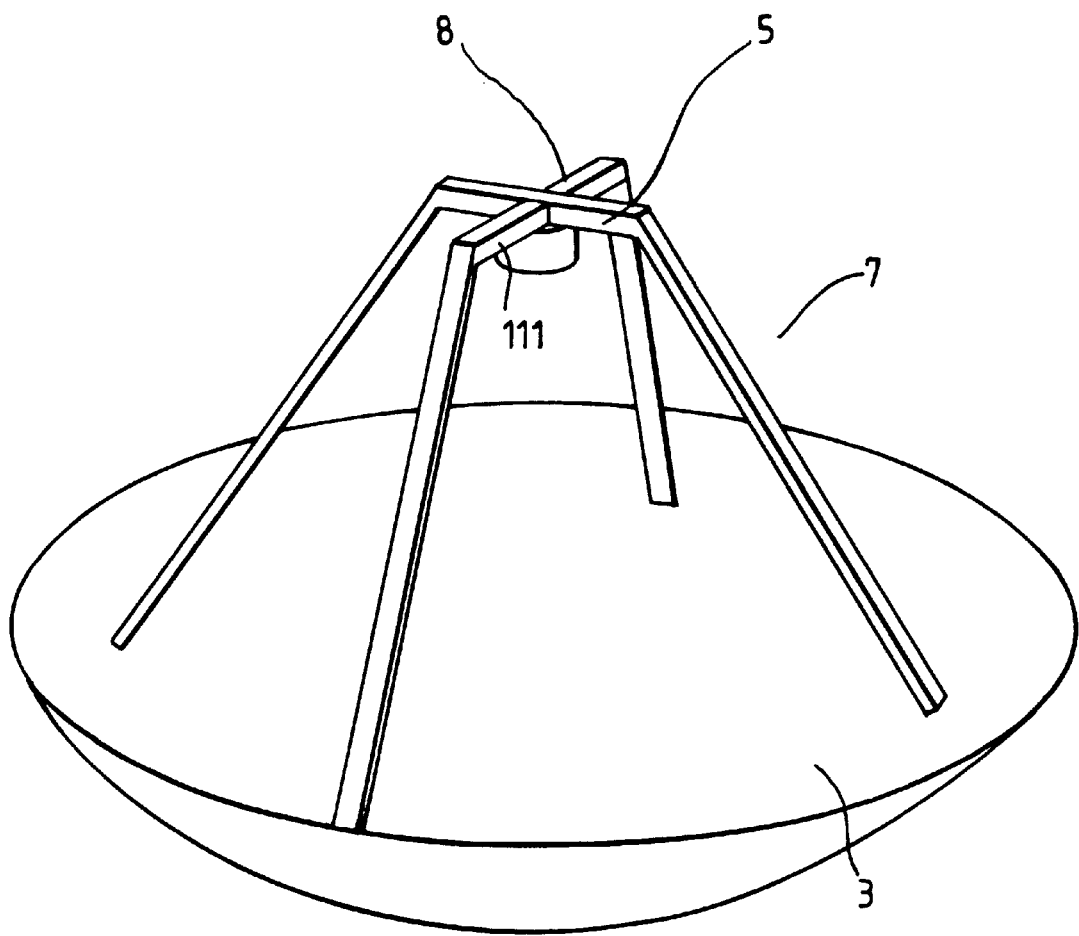
FIG. 13 is a perspective view of a preferred method of supporting the reciever.
Figure 14A:
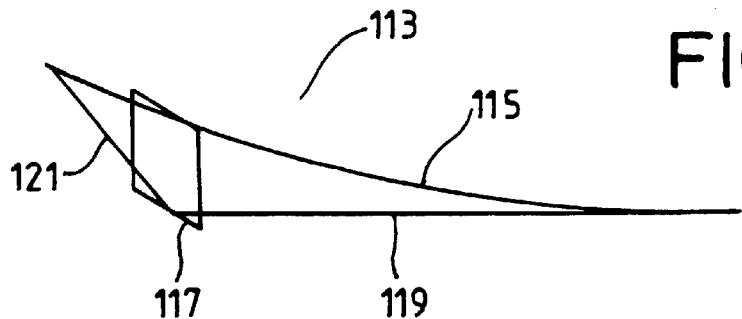
FIGS. 14a and 14b are, respectively, perspective and end elevation views of a support member forming part of a frame for supporting a parabolic reflector dish.
Figure 14B:
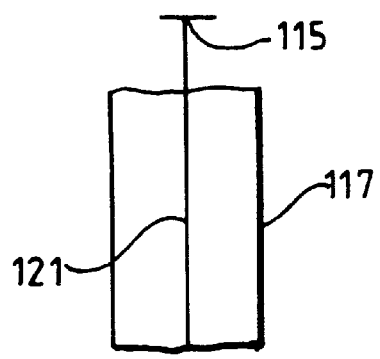

If during operation solar tracking is lost, focused solar radiation may track across the receiver, and is of sufficient solar flux to melt steel. Thus, any areas susceptible to being tracked by the focused solar image have to be protected with firebrick 111 or the like, see FIG. 13. The receiver is preferably supported by beams 7 and 8 as shown in this Figure. The underside of beams 8 are coated on firebrick 111 as is a portion of undersides of beam 7. The arrangement minimizes the blocking of reflected solar radiation by the beams. Beams 8 are preferably 0.08 dish diameters long.

Figure 15A:
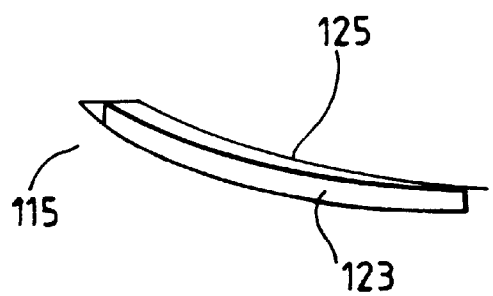
FIGS. 15a and 15b are views of alternative configurations for part of the support member of FIGS. 14a and 14b.
Figure 15B:
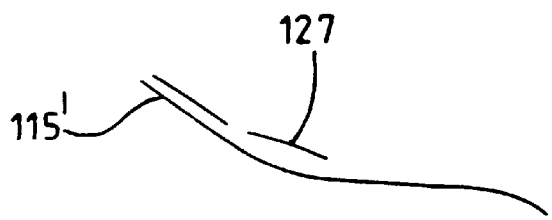
Figure 16:
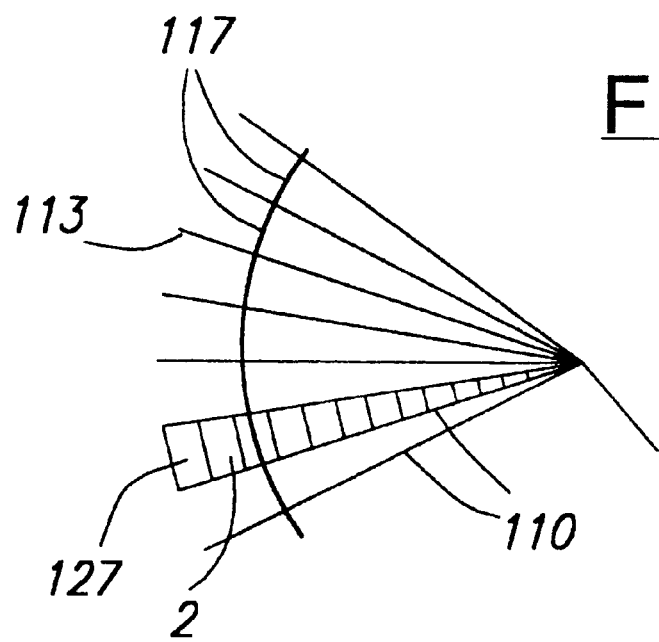
FIG. 16, is a schematic plan view of a portion of a parabolic reflector dish comprising a plurality of support members and of reflective planar segments.

FIGS. 14a, 14b, 15a, 15b and 16 illustrate the construction of a parabolic dish for reflecting solar radiation. A frame (a portion of which is shown in FIG. 16) for supporting the parabolic reflective surface comprises a plurality of radially-extending support members 113 connected together at the center of the dish and where rectangular plates 117 abut. Each support member 113 comprises a curved member 115 having a parabolic or near parabolic surface for supporting the reflective surface of the dish and has longitudinal members 119, 121 joining the ends of the curved member 115 to the rectangular plate. Cross-bracing (not shown) may be provided to stiffen the support member 113. The curved member 115 may comprise a flat plate 123 having a curved edge to which another length of strip material 125 is mounted to form a curved T-section member, as shown in FIG. 15a. Alternatively, the curved member 115' may be formed in a series of linear steps as shown in FIG. 15b, to facilitate the mounting thereto of a reflective surface formed of a plurality of planar sheets, or segments, (this being considerably easier to produce and less expensive than a curved, integral reflective surface).

A portion of a reflector dish comprising such a frame is shown in FIG. 16, adjacent support members 113 being joined together as described above, with a plurality of reflective planar sheets 127 mounted thereto. Each planar sheet 127 spans the distance between, and is mounted to, adjacent support members 113. As can be seen in FIG. 16, the size of each planar sheet 127 decreases as its distance from the center of the dish decreases. Thus, a reflector dish constructed as shown in FIG. 16 will have a large number of planar sheets 127 of varying size and shape and the dish so constructed will be unnecessarily heavy. The support and elevating mechanism for such a dish would therefore be similarly heavy, and the apparatus unnecessarily expensive.

Figure 17:
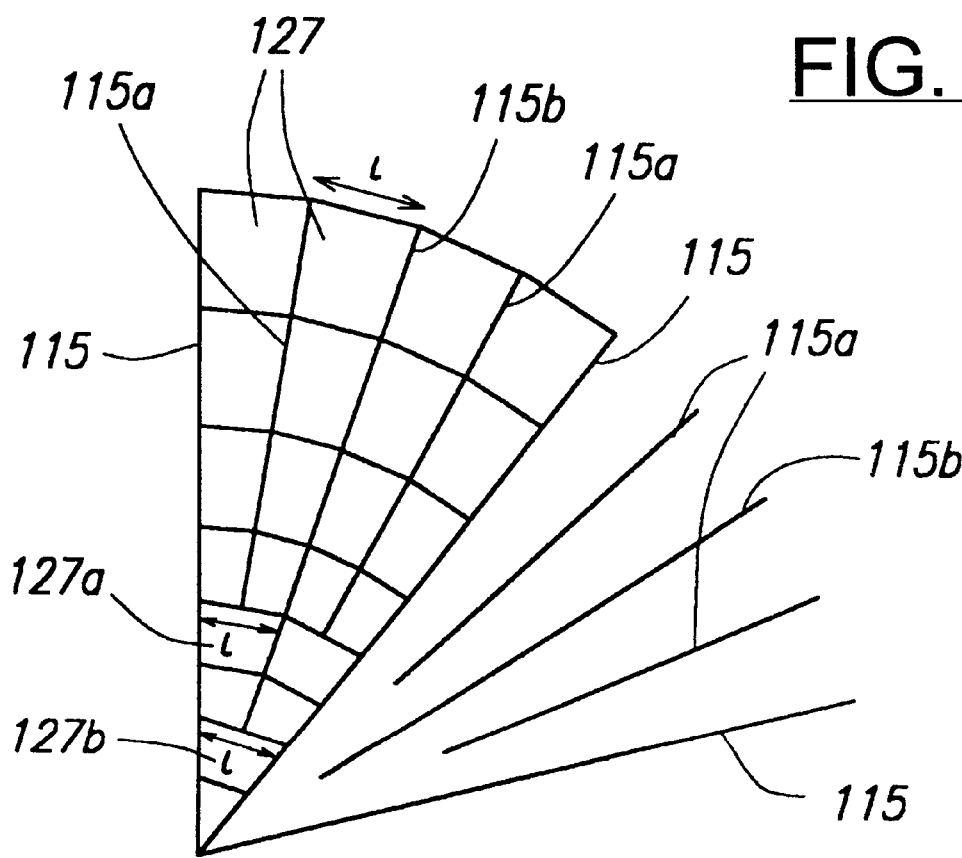
FIG. 17 is a schematic plan view of a portion of a parabolic reflector dish in accordance with the invention comprising a plurality of reflective planar segments and a plurality of support members.

An improved constructional arrangement for a reflector dish is shown in FIG. 17. The maximum tangential length of the outermost edge of the outermost planar sheet 127 is determined by the size of the aperture into which solar radiation is to be reflected (the same consideration applies to the maximum radial length of each planar sheet). Moving radially inwardly from the outermost edge of the dish, at a point equal to half the radius of the dish, a planar sheet 127a having an outer edge of length equal to the maximum tangential length will span the tangential distance between three adjacent support members 115, 115a, 115b. Accordingly, the central support member 115a need only be half as long as the radius of the dish. At a distance of one quarter of the radius of the dish from the center thereof, a planar sheet of maximum length will span the distance between five adjacent support members 115, 115a, 115b, 115a, 115, and therefore the central support member 115b need only be three quarters as long as the radius of the dish, and so on.

Thus, depending on factors such as the maximum size of the planar segments and the diameter of the dish, the lengths of adjacent support members may be expressed as numerically recurring series representing their lengths as proportions of the dish radius, namely:

1, ½, 1½, 1, ½ . . . ; or

1, ½, ¾, ½, 1, ½, ¾, ½ . . . ; or

1, ½, ¾, ½, ⅞, ½, ¾, ½, 1, ½ . . . ; or

1, ½, ¾, ½, ⅞, ½, ¾, ½, $^{15}/_{16}$, ½, ¾, ½, ⅞, ½, ¾, ½, 1, ½ . . .

and so on.

Each series may be represented as a recurring "set", each set comprising a number of support members which is a power of 2, i.e. 2, 4, 8, 16, 32 . . . or $2^x$ support members.

Thus, a dish may be constructed, as shown in FIG. 17, which is both lighter and less expensive than conventional reflector dishes comprising a plurality of reflective planar sheets. The principle of construction of a supporting frame for a parabolic dish described above may be applied to dishes of any size.

Figure 18A:
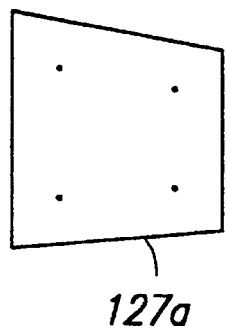
FIGS. 18a and 18b illustrate alternative forms of planar segments for use in a parabolic reflector dish.
Figure 18B:
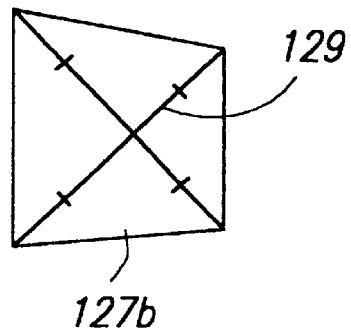

FIG. 18a illustrates planar sheets formed of a self-supporting material such as polished aluminium or steel 127a or of glass 127b (FIG. 18b), like a conventional mirror. A glass planar sheet 127b would be supported by a frame 129 of strong but lightweight material, such as aluminium alloy.

Figure 19:
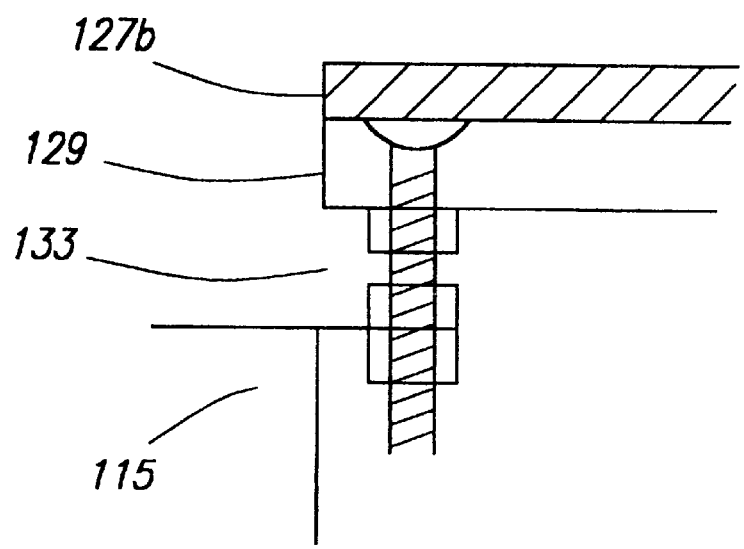
FIG. 19 shows a method of fixing the reflective planar segments of FIG. 18b to the support members of FIGS. 14a and 14b.
Figure 20:
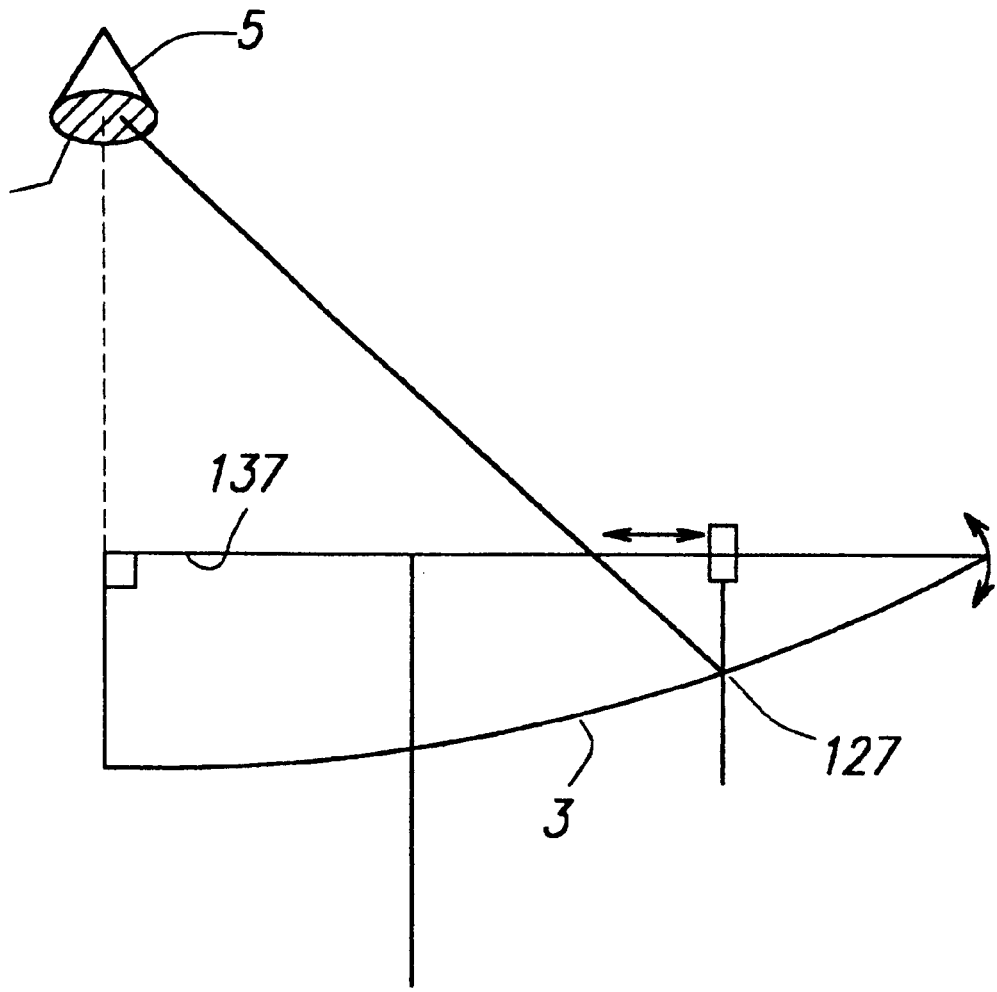
FIG. 20 shows a method of aligning reflective planar segments forming part of a parabolic reflector dish.

The planar sheets 127 are mounted to the support members 115, as shown in FIG. 19, by an adjustable bolt system 133 passing through holes 131 in each planar sheet 127a or each frame 129 whereby each planar sheet 127 may be aligned so as accurately to reflect light into the receiver.

In a conventional mirror, the reflective surface is the interface between the backing usually silver or aluminium. However, light of wavelengths around 500 nm is absorbed by normal or 'green' glass. This gives a maximum reflection efficiency of 85% with a silver back. This can be increased to 94% by reducing the iron content of the glass. This kind of glass is already used in some solar thermal applications.

The present invention provides a more efficient and less expensive apparatus for generating electrical power from solar radiation than known systems, and one which is protected from wind damage. It will be apparent that the features of dish construction may be applied independently of the non-gimbal mounting and weathershield structure herein described.

What is claimed is:

1. An apparatus for collecting and concentrating solar radiation comprising a reflector dish, means for rotating the dish about a first, substantially vertical axis, means for pivoting the dish about a second axis, the second axis lying in a plane parallel to but not coincident with the vertical axis, the pivoting means being effective to pivot the dish to any position between a first position in which the circumference of the dish lies in a substantially horizontal plane and a second position in which the circumference of the dish lies in a substantially vertical plane, and a weathershield extending around the vertical axis so as at least partially to surround the circumference of the dish in the first position, wherein the weathershield is rotatable and has a cut-away portion formed therein; the cut-away portion being orientable to prevent obstruction of solar radiation to the dish when the dish is between said first and second positions.

2. An apparatus in accordance with claim 1 wherein the second axis is substantially horizontal.

3. An apparatus in accordance with claim 1 wherein the second axis is fixed in relation to the first axis.

4. An apparatus in accordance with claim 1 comprising a cradle and means to rotate the cradle about the first axis, the dish being mounted so as to rotate with the cradle and to pivot with respect thereto.

5. An apparatus in accordance with claim 4 wherein the weathershield is mounted to the cradle so as to rotate therewith or mounted so as to move independently of the dish.

6. An apparatus in accordance with claim 1 wherein the second axis lies within the circumference of the weathershield.

7. An apparatus in accordance with claim 2 wherein the height of the second axis above the lower edge of the weathershield is equal to or greater than the maximum horizontal distance between the second axis and the circumference of the dish when the dish is in the first position.

8. An apparatus in accordance with claim 1 comprising means to sense wind speed and direction, the pivoting means being adapted to lower the dish to the first position when the sensed wind speed exceeds a predetermined speed.

9. An apparatus in accordance with claim 8 wherein the rotating means are adapted to rotate the dish to a position where the second axis is perpendicular to the sensed wind direction.

10. An apparatus in accordance with claim 1 comprising control means adapted to actuate the rotating means and the pivoting means to move the dish so as to follow the sun through its daily and seasonal motions.

11. An apparatus in accordance with claim 1 wherein the dish is a point focus reflector dish, the apparatus comprising receiver means located adjacent the focal point of the dish for absorbing solar radiation collected and concentrated by the dish for the generation of electrical power.

12. An apparatus in accordance with claim 11 wherein the receiver is supported on beams which project from the dish to the receiver outside the reflected ray path.

13. An apparatus in accordance with claim 1 wherein the reflector dish is parabolic and comprises a plurality of planar reflective segments mounted to and supported by a frame.

14. An apparatus in accordance with claim 13 wherein the frame comprises a plurality of support members extending radially inwardly from the outer circumferential edge of the dish toward the center thereof and having a planar segment supporting surface formed as a sector of a parabola or in a series of linear steps approximating thereto, adjacent support members being connected together.

15. An apparatus in accordance with claim 13 wherein some but not all of the support members extend from the outer circumferential edge of the dish to the center thereof.

16. A method of use of an apparatus as claimed in claim 1, the method comprising moving the dish in azimuth and elevation so as to track the diurnal and seasonal movement of the sun; orienting the cut-away portion formed in the weathershield to prevent obstruction of solar radiation to the dish; and in the event of wind speed exceeding a predetermined speed moving the dish to the said first position where the circumference of the dish is at least partially surrounded by the weathershield and orientating the cut-away portion so as not to face the direction from which the wind is blowing.

* * * * *